United States Patent [19]

Sobus

[11] Patent Number: 4,766,000
[45] Date of Patent: Aug. 23, 1988

[54] PREVENTION OF CHILL HAZE IN BEER

[75] Inventor: Michael T. Sobus, Philadelphia, Pa.

[73] Assignee: PQ Corporation, Valley Forge, Pa.

[21] Appl. No.: 59,659

[22] Filed: Jun. 8, 1987

Related U.S. Application Data

[63] Continuation-in-part of Ser. No. 755,644, Apr. 16, 1985, abandoned, which is a continuation-in-part of Ser. No. 674,803, Nov. 26, 1984, abandoned.

[51] Int. Cl.$^4$ .............................................. C12H 1/02
[52] U.S. Cl. ................................. 426/330.4; 426/423; 210/691; 210/502.1; 423/335; 252/313.2; 252/315.6
[58] Field of Search .................... 426/423, 330, 330.3, 426/422, 424, 330.4, 425, 592, 386, 387; 210/502.1, 691, 635; 423/338, 339; 502/232, 233, 234, 7; 252/313.2, 315.3, 315.6

[56] References Cited

U.S. PATENT DOCUMENTS

| | | | |
|---|---|---|---|
| 3,436,225 | 4/1969 | Raible | 426/330.4 |
| 3,472,835 | 10/1969 | Buckler | 426/387 |
| 3,617,301 | 11/1971 | Barby | 426/442 |
| 3,652,215 | 3/1972 | Aboutboul et al. | 423/338 |
| 3,652,216 | 3/1972 | Krekeler et al. | 423/338 |
| 3,810,843 | 5/1974 | Slusarczuk | 252/313.2 |
| 4,029,583 | 6/1977 | Ho Chang et al. | 502/7 |
| 4,508,742 | 4/1985 | McLaughlin et al. | 426/330.4 |
| 4,515,821 | 5/1985 | Armstead | 426/330.4 |

OTHER PUBLICATIONS

M. Gutch 1969 Alcoholic Malt Beverages Noyes Development Corporation Park Ridge NJ pp. 267–269.
Anon 1977 Sephadex Gel filtration in theory and practice p. 4.

Primary Examiner—Donald E. Czaja
Assistant Examiner—Carolyn Paden
Attorney, Agent, or Firm—Ernest G. Posner; Fred C. Philpitt; J. Stephen Bobb

[57] ABSTRACT

The components of chill haze in beer can be removed by contacting said beer with a combination of silica hydrogel and partially hydrophobic adsorbent(s) for a time sufficient to complete adsorption of the components and removing said adsorbents from the beer.

10 Claims, No Drawings

PREVENTION OF CHILL HAZE IN BEER

This application is a continuation in part of my copending patent application U.S. Ser. No. 755,644, filed July 16, 1985, now abandoned, which in turn is a continuation in part of my U.S. patent application Ser. No. 674,803, filed Nov. 26, 1984, now abandoned.

BACKGROUND OF THE INVENTION

This invention relates to chill-proofing beverages such as beer. The invention involves the use of combinations of various hydrophilic adsorbents such as silica gels and partially hydrophobic adsorbent(s) to remove various colloidal components of raw beer which form haze upon chilling.

The term "beer," as used in this specification and the claims, includes many types of brewed beverages. Such beverages include, but are not limited to, lager, pilsner, Dortmund and Munich beers as well as top fermented beverages such as ale, porter and stout.

Turbidity is an important and at times troublesome aspect of brewing operations. It can be of biological or physicochemical origins. Gross turbidity caused by suspended solids substantially above the colloidal range can be overcome by filtering or other separation methods. Various filter aids called fining agents are used to coagulate such coarse particles. Secondary and more subtle turbidity problems involve the haze which develops on aging and/or chilling the previously filtered beer. This haze is caused by the coagulation of a number of organic materials in the beer. These materials are not removed by the previously described filtration step.

A number of methods have been developed to remove at least some of the chill haze formers in beer. Among these methods are reaction with other organic material to precipitate filtrable compounds. A number of adsorbents are also used to remove certain fractions that cause chill haze. Silica hydrogels and xerogels, calcium, aluminum and magnesium silicates, diatomaceous earth, several types of natural minerals and clays and mixtures thereof have been suggested and used as chill-proofing agents. U.S. Patents that disclose such art include U.S. Pat. Nos. 3,163,538; 3,251,693; 3,436,225; 3,617,301; 3,940,498 and 3,958,023. These materials and methods have been successful with some beers but less than satisfactory with other beers.

It is an object of this invention to provide a combination of adsorbents that removes a wider range of chill haze components in a wide variety of beverages.

SUMMARY OF THE INVENTION

Combinations of hydrophilic and partially hydrophobic adsorbents provide excellent protection from haze formation upon aging or chilling in a variety of beverages, including a wide variety of beers and other brewed beverages. The inclusion of the partially hydrophobic adsorbent provides superior results when compared to the hydrophilic materials. The hydrophilic and partially hydrophobic agents can be added to the beverage separately, or they may be combined prior to use. Contact between the combination and the beer is maintained for a time sufficient for adsorption of the chill haze components. The filtering removes the adsorbents now containing the undesirable material. The hydrophilic portion of my combination can be siliceous adsorbents of various types, usually various types of silica gels. Silica hydrogels, silica xerogels and silica aerogels are useful. The hydrophobic component can be any adsorbent that has, or can be treated to provide, a partial hydrophobic character. These materials include organics that have the proper surface characteristics along with inorganics that can be coated or reacted with various hydrophobizing agents.

THE INVENTION

The major component of my chillproffing combination is a siliceous material capable of sorbing the colloidal fractions in beer that combine to cause haze upon aging and/or chilling. Usually, this siliceous material is a silica gel, prepared by adding acid to an alkali metal silicate solution under conditions that produce a hydrosol that completely solidifies upon aging. The properties of such gels are dependent upon the gel conditions, the technique used to dry, and other treatment. Silica gels formed with sufficient acid to at least completely neutralize the alkali in the silicate are designated regular density gels, which tend to have larger surface areas with smaller pores and pore volumes. If not all the alkali is neutralized, intermediate density gels are formed, which tend to have smaller surface areas with larger pores and pore volumes. Drying such gels using ordinary techniques tends to shrink the pores and form what is known as xerogel. Replacing the water in the pores of the gel with a solvent having a high vapor pressure and flash drying produces an aerogel which does not exhibit shrinkage of the pores. The surface area and density of the regular density gel can be altered by heating at various pH values and salt concentrations. Further discussion of gel preparation can be found in Iler, *The Chemistry of Silica*, (Wiley-Interscience, New York: 1979).

Another type of silica gel is especially useful in my combination. This silica is a specially prepared silica hydrogel with a surface area of at least 700 m$^2$/g, a mean pore diameter of 30 to 120 Å, an average particle size of 20 microns or less and a loss on ignition of at least 50% by weight. The preparation and properties of this hydrogel are disclosed in U.S. Pat. No. 3,617,301. This patent is hereby incorporated by reference.

The second component of my combination can be any of a number of adsorbents that have a partial hydrophobic character. Actually the adsorbent requires a balance of hydrophobic and hydrophilic character. The hydrophobic portion provides improved interaction between the adsorbent and the organic material to be adsorbed. The hydrophilic portion is required to provide sufficient and continuing contact between the adsorbent particle and the aqueous environment of the beer. The required balance can probably be described as not more hydrophobic character than will allow the adsorbent to remain in aqueous suspension under mild agitation.

Any adsorbent that can be rendered partially hydrophobic and retain its capacity to adsorb the desired organic species and is stable with silica hydrogel can be used in my combination. Dextrans and other organic polymers that are or can be rendered partially hydrophobic can be used. Various inorganics such as aluminosilicates, magnesium silicates, silicas and the like can be rendered partially hydrophobic and can be used. Partial silanation, among other methods, can be used to provide the required balance of properties. More than one such partially hydrophobic adsorbent can be used.

Precipitated silica is a good adsorbent to be hydrophobized as required for my invention. This and other materials can be rendered partially hydrophobic by reacting the material with a silane, a silicone or the like. The hydrophobizing agent must have a stable organic group that will endure curing and exposure to the beverage. The adsorbent should be treated with sufficient hydrophobizing agent to provide partial hydrophobic character. Up to about 5 or 7% provides the required activity. Reaction with about 10% of the agent or more appears to provide a reduction in effectiveness. I prefer that the hydrophobizing agent be about 0.5 to 5.0% of the final partially hydrophobic adsorbent.

Dextrans are partially hydrophobic materials that are useful second components of my composition. These materials are realized when certain bacteria act on sugar syrups, and are polymerized glucose. Useful dextrans have the formula $(C_6H_{10}O_5)_n$ and have molecular weights of 100 to 5000; cross-linked materials with higher molecular weights are also useful. Dextrans with substituted groups are also useful, condensation products with alcohols being one example.

The chill-proofing combination of my invention contains about 1 to 80 pbw of partially hydrophobic adsorbent(s) per 100 pbw of silica gel, i.e., 0.9 to 45% by weight of the partially hydrophobic material. I prefer the combination to contain about 2 to 60 pbw of partially hydrophobic adsorbent(s) per 100 pbw of the gel, i.e., 1.9 to 38% of the partially hydrophobic material. I most prefer 5 to 40 pbw of the partially hydrophobic material corresponding to about 4.7 to 29% of the partial hydrophobia in the chillproofing product. The components can be added to the beer separately, but I prefer that they be added as a blend or a co-gelled product. The required blending can be done in any manner, but can be accomplished during milling of the gel.

The combination can be contacted with the beer in any convenient manner and removed by any appropriate separation techniques. The level of treatment should be sufficient to remove the chill haze components, usually being between 20 and 2000 parts per million (ppm) based on the beer. I prefer to use about 200 to 800 ppm of the combination.

The chillproofing combination of my invention is added to the beverage in any convenient manner. It is maintained in contact for a time sufficient to adsorb the material desired and separated by filtering or centrifuging.

The combination of my invention can also be used with other beer treating agents such as filter aids, magnesium silicate, and polyvinylpolypyrrolidone, when desired.

EXAMPLES

The following examples illustrate certain embodiments of my invention. They should not be considered as establishing the scope of the invention. The scope is defined in the disclosure and recited in the claims. The proportions are in parts by weight (pbw), percent by weight (% w/w), and parts per million (ppm) unless otherwise indicated.

The chill haze prevention was measured in a laboratory simulation of chill haze formation. This simulation is a modification of a forcing test reported by K. Asano, K. Shinagawa and H. Hashimoto, "Characterization of Haze-Forming Proteins and Their Roles in Chill-Haze Formation" presented at the 48th Annual Meeting of the American Society of Brewing Chemists at Kansas City, Mo., in May, 1982. Crude beer proteins were obtained by ammonium sulfate precipitation (100% saturation) from unchillproofed beer. Fifteen pbw of said protein dispersion was mixed with 15 pbw of a solution of (±) catechin (800 mg/L) in a sealed vessel. The mixtures were heated at 100° C. for 20 minutes. After cooling the mixtures to room temperature, 0.5 pbw of the hydrogel/hydrophobic-adsorbent composition and of each component separately were added with vigorous agitation. Contact was maintained for 5 minutes prior to filtration. The filtrate was then chilled to 0° C. for 40 minutes and haze formation was measured in formazin nephelometer turbidity units (NTU) corrected for blank values.

Example 1

Blends of a hydrogel with a surface area of 800 m²/g, loss on ignition of 66.5% and a mean pore diameter of 87 Å and Sephadex* LH-20 were made by blending the two ingredients. These materials were tested as described previously. The hydrogel was tested separately as well. The results were as follows:

*SEPHADEX LH-20 is a hydrophobic dextran manufactured by Pharmacia Inc.

TABLE 1

| Composition (%) | | Haze |
|---|---|---|
| Hydrogel | Sephadex LH-20 | (NTU) |
| Blank | | 70.5  0.5 |
| 50 | 50 | 7.5  0.3 |
| 90 | 10 | 3.8  0.2 |
| 95 | 5 | 3.3  0.2 |
| 100 | | 10.1  0.2 |

These results show clearly the improved performance obtained by the use of my combination. There is a significant reduction of the haze when the Sephadex LH-20 is combined with the hydrogel.

Example 2

Three batches of a precipitated silica were treated with a silicone oil as follows. The silica was slurried with diethyl ether, then the silicone oil (a dimethyl siloxane) was added to the slurry. The diethyl ether was evaporated off before curing at 300° C. for 20 hours. The treatment yielded products that contained about 2, 5 and 10% of the silicone. The precipitated silica had a surface area of about 190 m²/g, a loss on ignition (2 hrs at 1000° C.) of 5% and an average agglomerate size of about 7 microns.

Five pbw of each of these materials was combined with 95 pbw of the hydrogel previously described and tested as previously described. The results are summarized in Table 2.

TABLE 2

| Chillproofing Agent | | Haze |
|---|---|---|
| Hydrogel | Precipitated Silica | (NTU) |
| 100 pbw | | 5.3 |
| 95 pbw | 5 pbw | 5.3 |
| 95 pbw | 5 pbw with 2% hydrophobe | 2.9 |
| 95 pbw | 5 pbw with 5% hydrophobe | 3.8 |
| 95 pbw | 5 pbw with 10% hydrophobe | 6.9 |
| | None | 58.0 |

Example 3

The procedure of example 2 was carried out with the same silicone oil from a different supplier. The results are summarized in Table 3.

TABLE 3

| Chillproofing Agent | | Haze |
|---|---|---|
| Hydrogel | Precipitated Silica | (NTU) |
| 100 pbw | | 5.3 |
| 95 pbw | 5 pbw | 5.3 |
| 95 pbw | 5 pbw with 2% hydrophobe | 3.2 |
| 95 pbw | 5 pbw with 5% hydrophobe | 4.0 |
| 95 pbw | 5 pbw with 10% hydrophobe | 6.9 |

The results are nearly the same as those of Example 2.

I claim:

1. A method for treating beer to prevent chill haze comprising the steps of:
   (a) contacting said beer with a combination of 1 to 80 pbw of partially hydrophobic adsorbent and 100 pbw of a silica gel, the amount of said combination being sufficient to remove the chill haze components, wherein the partially hydrophobic adsorbent is a precipitated silica reacted with up to 7% wt/wt of a silicone, wherein said silicone is dimethyl siloxane and said silica gel is a hydrogel having a surface area of at least 700 $m^2/g$, a mean pore diameter of 30 to 120 Å, an average particle size of 20 microns or less and a loss on ignition of at least 50% by weight (% w/w).

2. The method of claim 1 wherein the said precipitated silica is reacted with 0.5 to 5.0% by weight of silicone.

3. The method of claim 1 wherein the amount of the combination in contact with the beer is 20 to 2000 parts per million (ppm).

4. The method of claim 2 wherein the amount of the combination in contact with the beer is 20 to 2000 ppm.

5. A composition for treating beer to prevent chill haze consisting of 1 to 80 parts by weight (pbw) of a hydrophobic dextran (polymerized glucose) and 100 pbw of a silica gel, wherein the silica gel is a hydrogel having a surface area of at least 700 $m^2/g$, a mean pore diameter of 30 to 120 Å, an average particle size of 20 microns or less and a loss on ignition of at least 50% by weight (% w/w).

6. The composition of claim 5 wherein the molecular weight of the dextran is 100 to 5000.

7. A method for treating beer to prevent chill haze comprising the steps of:
   (a) contacting said beer with a combination of 1 to 80 pbw of a hydrophobic dextran (polymerized glucose) and 100 pbw of a silica gel, the amount of said combination being sufficient to remove the chill haze components, wherein the silica gel is a silica hydrogel having a surface area of at least 700 $m^2/g$, a mean pore diameter of 30 to 120 Å, an average particle size of 20 microns or less, and a loss on ignition of at least 50% wt/wt.
   (b) maintaining said contact for a time sufficient to remove the components of chill haze from the beer; and
   (c) separating the combination from the beer.

8. The method of claim 7 wherein the dextran has a molecular weight of 100 to 5000.

9. The method of claim 7 wherein the amount of the combination in contact with the beer is 20 to 2000 parts per million (ppm).

10. The method of claim 8 wherein the amount of the combination in contact with the beer is 20 to 2000 ppm.

* * * * *